US011576478B2

(12) United States Patent
Mauger

(10) Patent No.: US 11,576,478 B2
(45) Date of Patent: Feb. 14, 2023

(54) METHOD FOR SIMULATING THE RENDERING OF A MAKE-UP PRODUCT ON A BODY AREA

(71) Applicant: CHANEL PARFUMS BEAUTE, Neuilly sur Seine (FR)

(72) Inventor: Emmanuelle Mauger, Pantin (FR)

(73) Assignee: CHANEL PARFUMS BEAUTE, Neuilly sur Seine (FR)

( * ) Notice: Subject to any disclaimer, the term of this patent is extended or adjusted under 35 U.S.C. 154(b) by 0 days.

(21) Appl. No.: 17/270,581

(22) PCT Filed: Sep. 24, 2019

(86) PCT No.: PCT/EP2019/075618
§ 371 (c)(1),
(2) Date: Feb. 23, 2021

(87) PCT Pub. No.: WO2020/064676
PCT Pub. Date: Apr. 2, 2020

(65) Prior Publication Data
US 2021/0219700 A1    Jul. 22, 2021

(30) Foreign Application Priority Data
Sep. 26, 2018    (EP) .................................... 18306252

(51) Int. Cl.
*A45D 44/00* (2006.01)
*G06K 9/62* (2022.01)
(Continued)

(52) U.S. Cl.
CPC ......... *A45D 44/005* (2013.01); *G06K 9/6256* (2013.01); *G06T 11/001* (2013.01);
(Continued)

(58) Field of Classification Search
CPC ...... G06K 9/6256; A45D 44/005; G06N 3/08; G06T 11/60; G06T 11/001
See application file for complete search history.

(56) References Cited

U.S. PATENT DOCUMENTS 6,985,162 B1 * 1/2006 Schinnerer ............ G06F 3/1446
345/589
9,449,412 B1 9/2016 Rogers et al.
(Continued)

FOREIGN PATENT DOCUMENTS

CN    108090465 A    5/2018
EP    3 358 523 A1    8/2018
(Continued)

OTHER PUBLICATIONS

International Search Report and Written Opinion dated Jan. 10, 2020 in corresponding International Application No. PCT/EP2019/075618; 14 pages.
(Continued)

*Primary Examiner* — Phi Hoang
(74) *Attorney, Agent, or Firm* — Maier & Maier, PLLC

(57) ABSTRACT

A method for simulating a rendering of a makeup product on a body area including the steps of: acquiring an image of the body area without makeup of a subject, determining first color parameters of the pixels of the image corresponding to the body area without makeup, identifying the pixels of the body area without makeup exhibiting highest brightness or red component value, and determining second color parameters of the pixels of the image corresponding to the body area, wherein the second color parameters render a making up of the body area by the makeup product.

15 Claims, 5 Drawing Sheets

(51) Int. Cl.
  *G06T 11/00*   (2006.01)
  *G06T 11/60*   (2006.01)
  *G06V 10/56*   (2022.01)
  *G06V 40/10*   (2022.01)

(52) U.S. Cl.
  CPC .............. *G06T 11/60* (2013.01); *G06V 10/56* (2022.01); *G06V 40/103* (2022.01)

(56) References Cited

U.S. PATENT DOCUMENTS

| | | |
|---|---|---|
| 2015/0145882 A1 | 5/2015 | Nguyen et al. |
| 2016/0106198 A1* | 4/2016 | Yoshida ................. A61B 5/441 356/402 |
| 2017/0360178 A1 | 12/2017 | Samain et al. |
| 2018/0077347 A1* | 3/2018 | Tanaka ............... H04N 5/23293 |
| 2019/0325616 A1* | 10/2019 | Chhaya .................... G06N 3/08 |

FOREIGN PATENT DOCUMENTS

| | | |
|---|---|---|
| KR | 10-2017-0091137 A | 8/2017 |
| WO | 98/21695 A1 | 5/1998 |
| WO | 02/05249 A2 | 1/2002 |

OTHER PUBLICATIONS

Korean Office Action dated Jul. 27, 2022, in corresponding to Korean Application No. 10-2021-7004838; 13 pages (with English Translation).

Office Action dated May 13, 2022, in connection with corresponding European Application No. 18306252.0; 5 pages.

\* cited by examiner

METHOD FOR SIMULATING THE RENDERING OF A MAKE-UP PRODUCT ON A BODY AREA

FIELD

The invention relates to a method for simulating the rendering of a makeup product on a body area, the method comprising the generation of an image where the application of the makeup on the body area is simulated. The invention is applicable to the simulation of lipstick, nail polish and eyeshadow.

BACKGROUND

Selecting a make-up product is not always easy for consumers, because they have to imagine the rendering of the make-up product on their skin (or nails), without the possibility to actually try the make-up product. Sometimes, the rendering on the skin may be quite different from the color of the product itself, i.e. the color of the lipstick for instance.

In a shop, it may be possible to have better idea of the rendering of the make-up product, either by trying a tester lipstick on a hand, or by looking at a false nail covered with a nail polish.

However the rendering on the skin of the consumer may still be different because of the skin or lips color.

Additionally, more and more cosmetic products are being sold on the internet where no such testing is available. Accordingly, the colors of the make-up products are rendered by patches or sometimes a picture of a model made-up with the product is shown in order to provide a better idea of the tint of the product.

In that case it may still be difficult to imagine the actual color of the product on itself, and to compare it with other products in order to determine a choice.

In this perspective, some applications of virtual make-up have been developed. Some of the applications comprise rendering make-up on a picture of a subject, without taking into account the skin color of the subject, i.e. the same rendering is achieved whatever the skin color of the subjects, which leads to unrealistic simulation.

It is known also from document US 2015145882 a method for simulating the rendering of makeup on a subject, in which the processing of the image of the subject is performed in an HCL (Hue, Chroma, Luminance) color space, and comprises the computation of an average luminance of the lips and a map of the luminance of the lips, and the simulation of making up of the lips by computing an simulated pixel per pixel luminance from the luminance of the lipstick and computed average luminance and map of the luminance of the lips. Adjustment of contrast and hue is then performed by application of the ratio.

The method disclosed in this document thus takes into account the natural color of the lips, but does not render the brightness of the lips, as this factor is not taken into account in the model.

SUMMARY

An aim of the invention is to improve the simulation of the rendering of a make-up product of a subject.

In particular, the invention aims at providing a method for simulating the rendering of a make-up product of a subject, in which the rendering is as close as possible to reality.

Another aim of the invention is to improve the rendering of the brightness of a made-up area of a subject.

Accordingly, the invention proposes a method for simulating a rendering of a makeup product on a body area, the method being performed by a processor, and comprising:
  acquiring an image of the body area without makeup of a subject,
  determining first color parameters of the pixels of the image corresponding to the body area without makeup,
  identifying the pixels of the body area without makeup exhibiting highest brightness or red component value,
  determining second color parameters of the pixels of the image corresponding to the body area, wherein the second color parameters render a making up of the body area by the makeup product,
wherein said determining step comprises:
  applying on the determined first color parameters and on the color parameters of the makeup product to be simulated, a simulation model configured to output color parameters of the pixels of the image corresponding to the same body area made-up with the make-up product, and
  correcting the obtained color parameters of the pixels of the body area identified as having highest brightness or red component value without makeup,
the second color parameters comprising the corrected color parameters for the identified pixels and the color parameters output by the simulation model for the other pixels of the body area, and
  generating a modified image in which the first color parameters of each pixel corresponding to the body area are changed respectively into the corrected second color parameters.

Preferably, the simulation model has been trained on a learning database comprising, for a plurality of reference make-up products, color parameters of the reference make-up product and a set of pairs of images of the body areas of reference subjects, each pair of images comprising an image of the body area of the reference subject without makeup and an image of the body area of the reference subject made-up with the reference make-up product.

In an embodiment, the learning database further comprises:
  for each image, identification of a quantile to which a pixel of the body area in the image belongs, for each color component of the pixel,
  for each image, the coordinates of the pixels of the body area expressed in percentage of a zoom applied to the image,
  for each reference make-up product, average values per quantiles of the color parameters of the pixels of the body area with the reference make-up product.

The learning database may further comprise:
  for each image, a brightness value of each pixel of the body area of the image, and an identification of the quantile of brightness values to which the pixel belongs, and
  for each reference make-up product, average values per quantiles of brightness of the pixels of the body area with the reference make-up products.

In embodiment, the correction step comprises replacing the color parameters of the pixels identified as having highest brightness or red component values, by respective average values of color parameters,
the average values being computed over the pixels of highest red component or brightness values of body areas of images of reference subjects, made-up with a same reference make-up, said reference make-up product having color parameters most similar to the color parameters of the make-up product to be rendered.

The pixels of highest red component values among pixels corresponding to the body area of an image may be determined by:
- computing quantiles of red component values of the pixels corresponding to the body area of the image,
- determining the pixels of highest red component values as the pixels belonging to at least the quantile comprising the pixels having the highest red component values.

The method may further comprise a step of performing a gamma correction on the modified image.

The color parameters of a pixel of an image preferably are values of the RGB color model, and the simulation model comprises three models configured to determine respectively red, green and blue values of the pixels from the input data.

The color parameters of a make-up product preferably are values in the CIE L*a*b* color space.

The body area is preferably chosen among the group consisting of:
- lips,
- eyelids, and
- nails, and the make-up product is:
- lipstick if the body area is the lips,
- eyeshadow if the body area is the eyelids, or
- nail polish if the body area is the nails.

According to another object of the invention, a computer program product is disclosed, comprising a set of code instructions for implementing the method disclosed above, when it is executed by a processor.

According to another object of the invention, a device for simulating a rendering of a makeup product on a body area is disclosed, the device comprising:
- a camera adapted to acquire the image of a body area to be made-up of a subject,
- a processor, adapted to receive and process the image acquired by the camera to generate a modified image simulating the rendering of a make-up product on the body area, and
- a display adapted to display the modified image, wherein the device is configured to implement the method according to the above description.

According to still another object of the invention, a method of generating a simulation model for simulating the rendering of a make-up product on a body area is disclosed, the method being performed by a processor, wherein the method comprises training a simulation model on a learning database comprising, for each one of a plurality of reference make-up products:
- color parameters of the reference make-up product, and
- a set of pairs of images of the body area of reference subjects, each pair of images comprising an image of the body area without makeup of a reference subject and an image of the body area of the reference subject made-up with the make-up product, the simulation model being configured to determine, from input data comprising:
- color parameters of a makeup product to be rendered,
- color parameters of pixels of an image corresponding to a body area of a new subject to be made-up, and color parameters of the pixels of the image corresponding to the same body area of the new subject, said body area being made up with the make-up product.

Preferably, the training of the simulation model comprises:
- training a plurality of simulation models on the learning database,
- computing prediction errors of each of the plurality of simulation models on bootstrap samples among the learning database, and
- selecting the simulation model according to the computed prediction errors.

The method of generating a simulation model may further comprise, for each reference make-up product, a step of computing the average color parameters of the pixels having highest red component or brightness values of all the images of the reference subjects made-up with the reference make-up product,
and storing the average color parameters for each reference make-up product in a memory.

In an embodiment, the learning database further comprises, for each image, the coordinates of the pixels of the body area expressed in percentage of a zoom applied to the image.

Another object of the invention is a computer program product, comprising a set of code instructions for implementing the method of generating a simulation model described above, when it is executed by a processor.

The method according to the invention involves the use of a trained simulation model to simulate the rendering of a make-up on a body area of a subject.

According to this method, a correction is implemented on the brightest pixels of the body area of the person, without makeup, to respect said brightness in the rendering performed by the method.

Moreover, the model is advantageously configured to take into account the natural color of the body area of the subject, without makeup, as well as its brightness, for enhanced performances.

The training of the model on a learning database ensures that the rendering output by the model is natural and as close as possible to reality.

The proposed method thus provided an entirely automated way to obtain simulated images of a body area madeup with a given make-up product as close as possible to reality.

BRIEF DESCRIPTION OF THE DRAWINGS

Other features and advantages of the invention will be apparent from the following detailed description given by way of non-limiting example, with reference to the accompanying drawings, in which.

DETAILED DESCRIPTION

Figure 1:
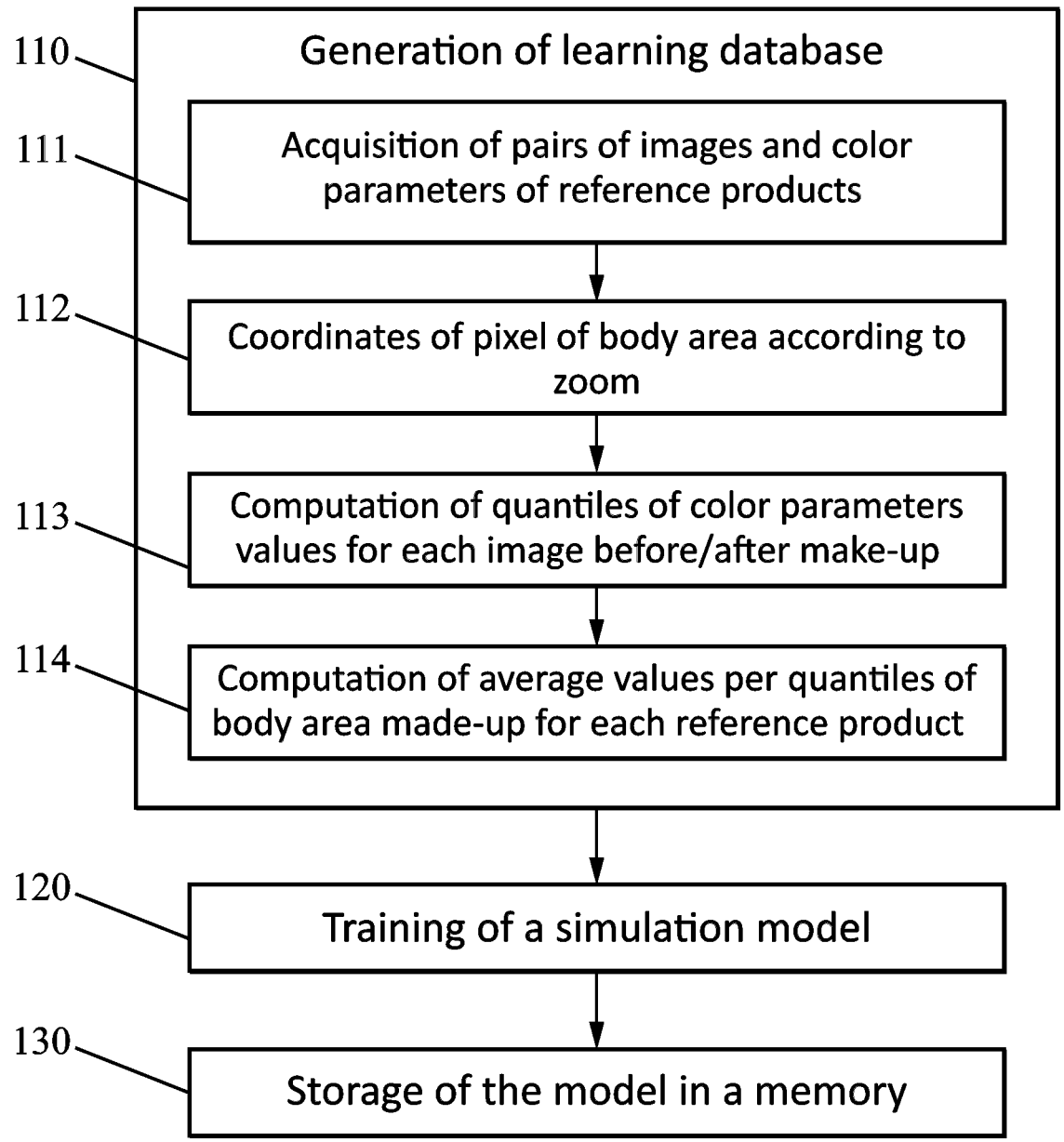
FIG. 1 schematically represents the main steps of a method of generating a simulation model according to an embodiment of the invention, FIG. 2 schematically represents the main steps of a method of simulating a rendering of a make-up according to an embodiment of the invention, FIG. 3 schematically shows the components configured to implement the methods of generating and running a simulation model of FIGS. 1 and 2, FIGS. 4a to 4d respectively show the image of lips of a subject without make-up, then with simulation of makeup without and with brightness correction, and then actually made-up with the same make-up product.

With reference to FIG. 1, a method 100 for generating a simulation model for the rendering of a make-up product on a body area of a subject will now be described.

In all that follows, the body area can be lips, and the make-up product is lipstick or gloss or any equivalent thereof. The body area can also be the nails, and the make-up product is a nail lacquer. The body area can also be the eyelids, and the make-up product is a monochrome eyeshadow.

Figure 3:
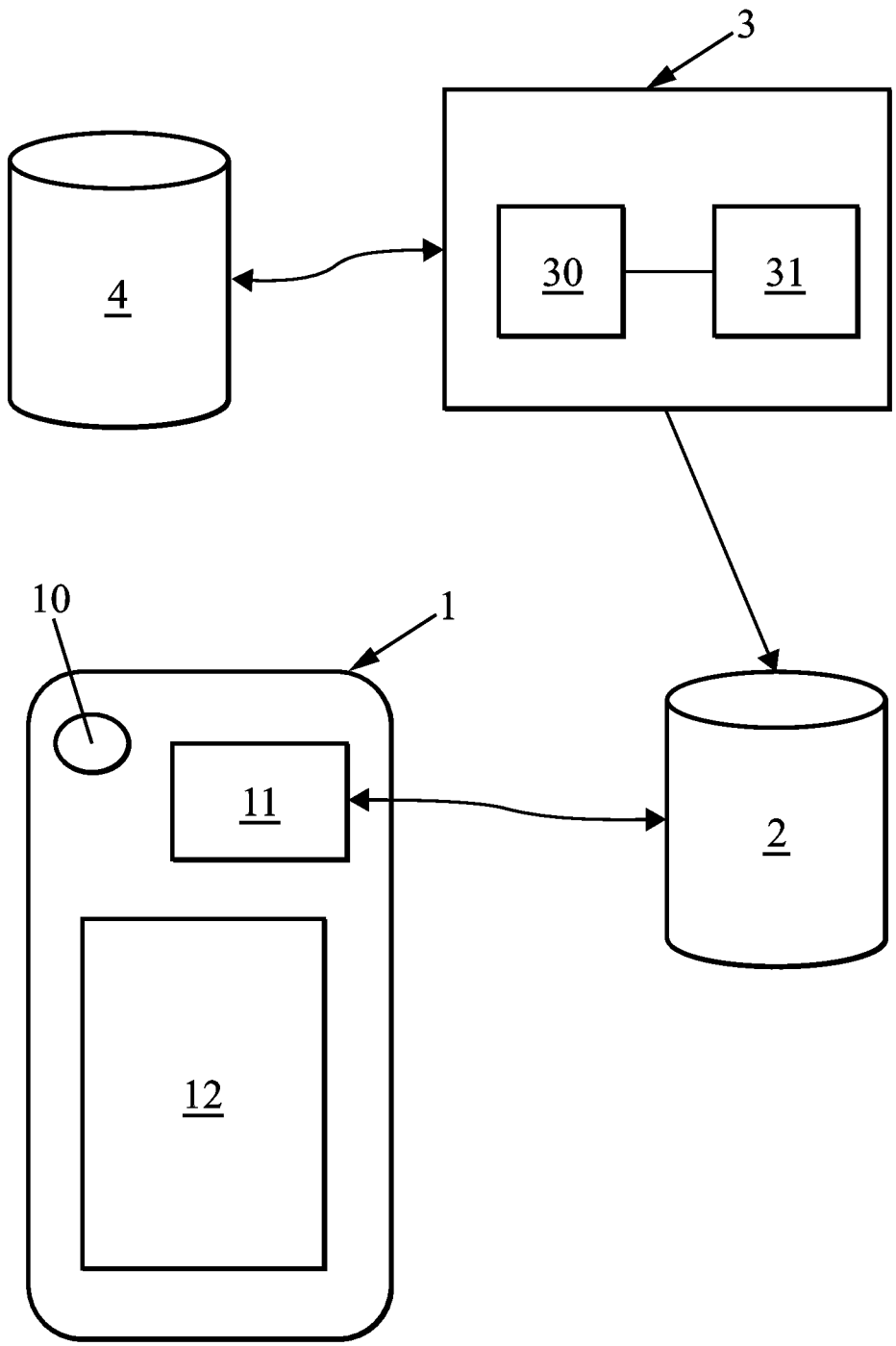

The generation of a simulation model is performed by a computing device 3 shown schematically in FIG. 3, comprising a processor 30 and a memory 31. The processor 30 is configured to execute code instructions for the implementation of the method, said code instructions being stored on the memory 31.

The simulation model is a model learned on a learning database. Thus, according to a first step 110, a learning database is generated and stored in the memory 31, or on a distinct memory, for instance a distant memory 4.

The learning database comprises information relative to a plurality of reference make-up products of a same nature (i.e. either lipstick or nail polish or eyeshadow), including in particular an identifier of a reference make-up product, and color parameters of the reference make-up product.

In an embodiment, the color parameters of a reference make-up product are determined from color patches representing the color of the reference make-up product, for example on an internet website such as an e-shop. The color patches have RGB (standing for "Red Green Blue" color parameters) values that are preferably, but optionally, converted into color parameters in the CIEL*a*b* color space for later better comparison between the color features of two make-up products. In the CIE L*a*b color space, the color parameters are defined as follows:
- the L* coordinate corresponds to a luminance degree, varying on a 1-100 scale between black and white,
- the a* coordinate varies along an axis between red and green, on a 0-255 scale (or alternatively −100; +100, or −127; +127) from green (0) to red (255), and
- the b* coordinate varies along an axis between blue and yellow, on a 0-255 scale (or alternatively −100; +100, or −127; +127) from blue (0) to yellow (255).

The conversion between the RGB color parameters and the coordinates in the CIEL*a*b* color space can be performed by computing the following intermediate parameters W, Y, Z, such that:

$$W = 0.4303R + 0.3416G + 0.1784B$$

$$Y = 0.2219R + 0.7068G + 0.0713B$$

$$Z = 0.0202R + 0.1296G + 0.9393B$$

And then computing the L*, a*, b* coordinates as follow:

$$L^* = 116\left(h\left(\frac{Y}{Y_s}\right)\right) - 16$$

$$a^* = 500\left(h\left(\frac{W}{W_s}\right)\right) - h\left(\frac{Y}{Y_s}\right)$$

$$b^* = 200\left(h\left(\frac{Y}{Y_s}\right)\right) - h\left(\frac{Z}{Z_s}\right)$$

where $$h(q) = \begin{cases} \sqrt[3]{q} & \text{if } q > 0.008856 \\ 7.787q + \frac{16}{116} & \text{if } q \leq 0.008856 \end{cases}$$

and where Ys, Ws and Zs are values of a reference white point.

According to another embodiment, the color parameters of the make-up products may be obtained from absorption spectroscopy performed on the bulk products instead of images displaying a patch of color. In that case the color parameters may readily be available in the CIE L*a*b* color space.

The learning database further comprises, for each one of the plurality of reference make-up products, a set of pairs of images relative to respective subjects, wherein each pair of images comprises:
- an image of a body area of the subject (for instance the lips if the reference make-up product is lipstick) without makeup, and
- an image of the body area of the subject actually made-up with the reference make-up product.

Preferably, the set of pairs of images comprises at least 10 pairs of images, and even more preferably at least 20 pairs of images, corresponding to respective subjects for each of the plurality of reference make-up product.

Thus a first step 111 of forming the learning database is acquiring the set of pairs of images for each reference make-up products, as well as the color parameters of each reference make-up product.

Also, each image of the learning database is preferably processed to isolate body areas of same size and resolution. According to an embodiment, two images corresponding to the same subjects are superposed so that the coordinates of a same point of the subject correspond on the two images. The coordinates of a fixed number of reference points of the body area are then determined, in order to localize precisely the body area in the image.

Optionally, a zoom may be performed on the body area in order to limit the computational time required to the processing.

The portion of the image corresponding to the body area is then cropped, so that the remainder of the processing is only applied to this portion.

Optionally, in order to perform the cropping with sufficient precision, a classification algorithm may be applied to each image in order to determine, for each pixel, if the pixel belongs or not to the body area which is concerned by the makeup. This classification algorithm is not implemented if the coordinates of a sufficient number of reference points are determined, with enough precision.

The coordinates of each pixel of the studied body area in the zoom image are preferably extracted and added to the learning database at step 112. In order to manage different body area sizes, this position is expressed in percentage of the size of the zoom for abscissa and ordinate.

Then, for each image of a pair of images of the learning database, the color parameters R, G, and B of each pixel of the body area of each image of a pair (i.e. before and after application of the reference make-up product) are measured during a step 113.

Preferably, but optionally, the perceived brightness of each pixel of the body area is also computed during this step 113 and stored in the learning database.

A brightness value of a pixel can be computed from the RGB values of the pixels, according to a formula given by Darl Rex Finley in "HSP Color Model—Alternative to HSV(HSB) and HSL" in http://alienryderflex.com/hsp.html, as:

$$\text{brightness} = \sqrt{0.299R^2 + 0.587G^2 + 0.114B^2}$$

From these color parameters values are computed, for each image of the learning database (with and without make-up), quantiles of the color parameters values, noted for instance $Q_{R,i}$, $Q_{G,i}$ and $Q_{B,i}$ and optionally brightness values of the pixels of the body area, noted $Q_{BR,i}$, where i ranges from 1 to n and n is the number of quantiles.

The quantiles are defined as ranges of values of color parameter or brightness dividing the number of pixels of the body area into groups containing the same number of pixels having color parameter or brightness values included in the ranges defined by the quantiles.

The number n of quantiles can be determined by use of the Sturges rule disclosed in the publication by R. J. Hyndman et al., "Sample quantities in statistical packages", in The American Statistician, 50(4):361-365, 1996.

Once the quantiles are determined for an image for all the R, G, B and optionally brightness values, additional information is stored in the learning database associating, for each pixel of an image, the quantile to which it belongs for each of the red, green and blue components, and optionally also for the brightness value.

Additionally, for each reference make-up product of the learning database, the average values per quantiles of the pixels of all the images of the body areas madeup with said reference makeup product are computed during a step 114, for each of the red, green and blue components.

So for one reference make-up product, average values $\overline{R}_i$, $\overline{G}_i$, $\overline{B}_i$ are computed for each quantile (i ranging between 1 and n).

Optionally, the average values of the brightness per quantile are also computed. As a non-limiting example, if there are 20 quantiles for the R, G, B values of the pixels in each image, an average R value is computed over each one of the 20 quantiles, the same for an average G value and an average B value.

These average values complete the learning database and are stored in the same memory.

The method then comprises training 120 a simulation model on the learning database, the simulation model being configured to determine, from input data comprising at least:
color parameters of a makeup product to be simulated and
color parameters of the pixels of an image corresponding to a body area to be made-up,
output data comprising color parameters of the pixels of the image corresponding to the same body area made-up with the make-up product to be simulated.
Preferably, the input data submitted to the simulation model further comprise:
brightness values of the pixels of the image corresponding to the body area to be made-up, and
pixel coordinates of the body area to be made-up expressed in percentage of the zoom.

The position of the pixel coordinates of the body area expressed in percentage of the zoom increases the precision of the model as it allows a better comparison of pixels located at similar areas of a zone such as the lips, the eyes, etc.

Taking into account the brightness values of the pixels of the image enhances the performance of the simulation model for a realistic rendering of the make-up product.

The simulation model is trained during a supervised learning on the learning database comprising, as described above:
Pairs of images before and after application of a reference make-up product,
Pixel coordinates of the body area of each image expressed in percentage of the zoom,
Identification of the quantiles of the color parameters (RGB), and optionally brightness, to which belongs each pixel of the body area on each image,
Averages values of the color parameters and optionally brightness per quantiles of the pixels of the body area with a reference make-up product, computed for each reference make-up product.

The two last features of the list act as constraints on the values of the color parameters of the made-up body area output by the model.

The simulation model is therefore trained to minimize the error between the color parameters output by the simulation model and actual color parameters of a body area made-up with the reference make-up product.

Preferably, the simulation model comprises three models, each of the three models receiving the inputs listed above, and being configured to respectively output the R, G and B values of the pixels of an image of a subject to be made up with a reference product.

The establishment of one simulation model by color parameter allows a better precision of the model, because each of the RGB color parameter is determined taking into account all the RGB color parameters and optionally brightness values of the input image.

Moreover, step 120 preferably comprises training a plurality of simulation models (each one comprising a model for each of the R, G and B values) on the learning database, and choosing the simulation model exhibiting the best results according to a predefined criterion. The criterion can be for instance minimizing the mean prediction error of the simulation model. Alternatively, the criterion can be optimizing at the same time the mean prediction error of the simulation model and the computational time of the simulation model.

To this end, preferably each of the plurality of simulation models is tested on bootstrap samples of the learning database, comprising for instance between 20 and 40% of the data of the learning database. The testing of a model comprises its application on the input data listed above to output color parameters of the pixels of the same body area as in the input data with the make-up product defined in the input data. Then a mean prediction error is computed such as for example:

$$\frac{\sum_i prev[i] - act[i]}{n}$$

Where i identifies a pixel of the body area, prev[i] is a color parameter (R, G or B) of the pixel output by the model, act[i] is the actual color parameter of the image of the body area made up with the make-up product, and n is the number of pixels in the body area.

The tested simulation models may for example be chosen among the following group:
ordinary least squares (OLS) regression,
OLS regression with selection of significant variables,
OLS regression with interactions,
Ridge regression,
Lasso regression,
Elasticnet regression,
Decision tree,
Random forests,
Generalized additive models,
Gradient Boosting Models, etc.

Once a simulation model optimizing the criterion is identified, said model is saved during a step 130 in a memory, along with:

- The information relative to each of the reference make-up products, including for each reference make-up product an identifier and color parameters of the make-up products, and
- For each reference make-up product, the average color parameters (R, G, B and optionally brightness) of the pixels of body areas of the learning database made-up with the reference make-up products belonging to the highest quantile of the red component value or of the brightness value.

All this information can be stored in the same memory 4 as the one in which is stored the learning database. Alternatively, it is stored in a distinct memory 2, which can also be remote from the computing device 3.

Simulation of the Rendering of a Make-Up

A method 200 for simulating the rendering of make-up on the image of a body area of a subject will now be described.

This method is preferably performed by a device 1 shown schematically in FIG. 3, comprising:

- a camera 10, configured to acquire images of a body area of a subject,
- a processor 11, adapted to receive an image acquired by the camera and to implement the method described below to generate a modified image in which the rendering of a make-up on the body area is simulated, and
- a display 12, adapted to display the modified image.

In an embodiment, the device 1 is a personal electronic device of a user, such as for instance a mobile phone or a digital tablet. In that case the camera is the camera of the personal electronic device, and the display is the screen of the device.

In another embodiment, the device 1 may be dedicated to the function of simulating the rendering of make-up and may be installed in a beauty salon or a shop. In that case the display 12 may be an augmented mirror, i.e. a screen displaying in real time an image of a subject positioned in front of the screen, and the camera is integrated inside the augmented mirror.

This embodiment is preferred because it allows taking pictures in controlled lighting conditions and hence reduces the processing of the images that needs to be done on the acquired images to make them compatible with the trained model.

Alternatively, if images are acquired in various lighting conditions, the learning database may be enriched with pictures of various lighting conditions in order to train the model to be robust to a change in lighting conditions.

In an embodiment, the processor 11 has access to the memory 2 in which is stored the trained model as well as the information relative to the reference make-up products and the average color parameters for highest quantile of red component value or brightness value, for each reference make-up product. For instance, this memory may be remote from the processor 11 and the processor 11 may have access to the memory through a communication network and a suitable interface for connecting the processor 11 to the network.

Figure 2:
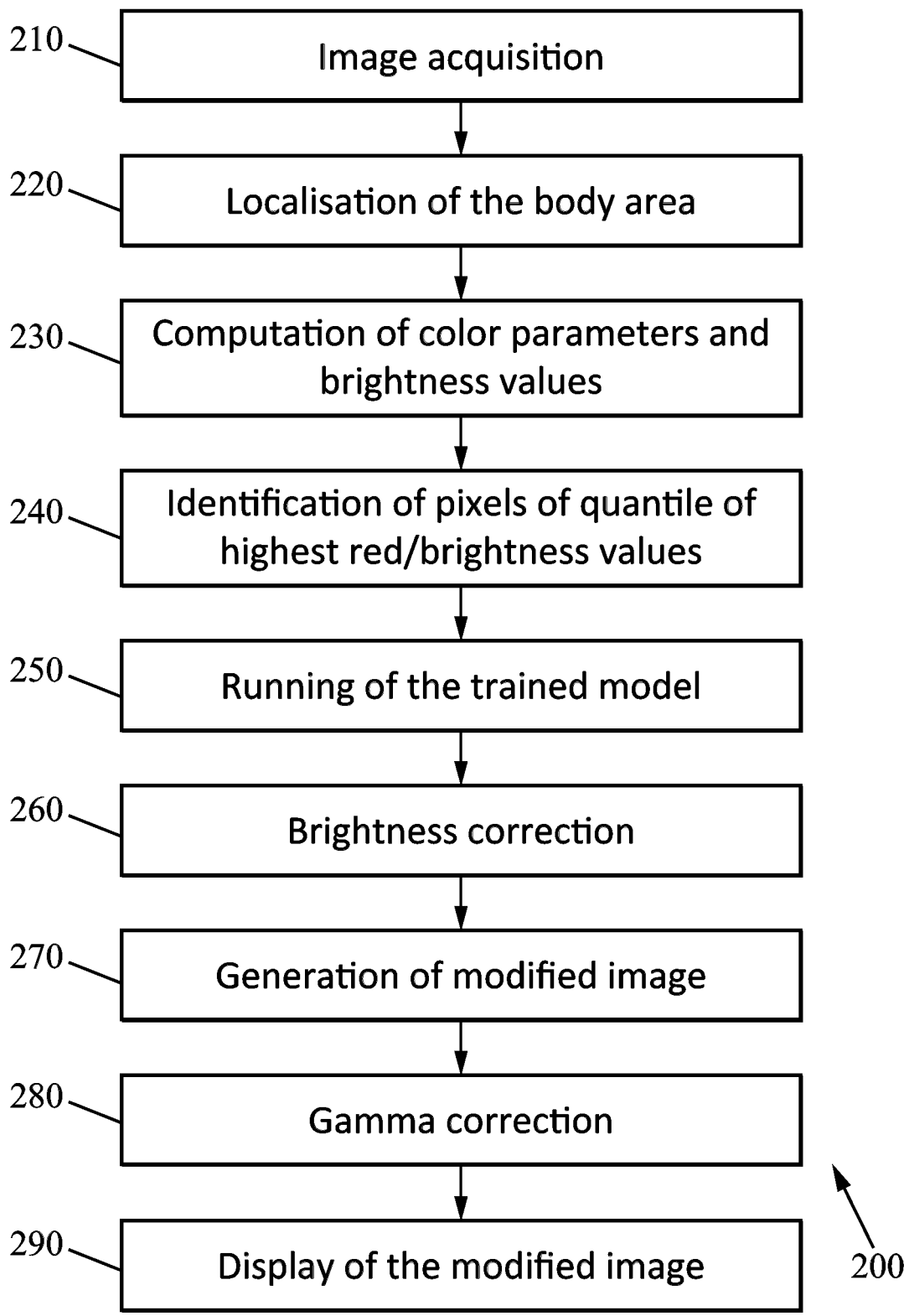

With reference to FIG. 2, a first step 210 of the method 200 comprises the acquisition of an image of the body area of a subject without makeup. The acquisition may be performed by the camera 10 taking a picture of the body area. Alternatively, the image may have been previously acquired and stored in a memory, in which case the acquisition of the image is the loading of the image from the memory.

During the same step, a make-up product that has to be virtually rendered on the image is selected by the subject. For instance, a list of make-up products can be displayed on the display 12, for the subject to select. Preferably, the list of make-up products corresponds to the list of reference make-up products so that any make-up product selected by the subject belongs to the list of reference make-up products on which the model has been trained. Typically, the list of reference make-up products corresponds to a list of make-up products commercially available for a given brand.

The method then comprises a step 220 of processing the acquired image to precisely locate the body area within the area. This step may comprise detecting the body area to be made up and determining the coordinates of a fixed number of reference points on the body area.

To perform the body detection, the open source DLIB library or Haar Cascade can be used. Optionally, according to the determined coordinates, a zoom may be performed on the acquired image to bring the body area at the required resolution, and then the body area to be made up is cropped. The coordinates of each pixel from the studied body area are acquired. This position is converted in percentage of the size of the zoom for abscissa and ordinate According to a step 230, the color parameters of each pixel of the body area are acquired. The color parameters of a pixel are preferably the R, G and B values of the pixel. Moreover, during the same step, the brightness value of each pixel is optionally from the color parameters, according to the equation of brightness given above.

During a step 240, quantiles of each of the color parameters and brightness are computed the same way as during step 113 described above, and the pixels belonging to the quantile of highest red component values, or the quantile of highest brightness values, are identified.

The method then comprises a step 250 of running the trained model, which has been accessed by the processor, on the body area of the image.

The inputs of the trained model at this step are therefore:

- the color parameters (RGB) of pixels of the body area to be made-up of the image,
- preferably, the brightness values of the pixels of the body area to be made-up,
- the color parameters of the selected make-up product to be rendered, which can be provided with the image of the subject, or retrieved from the database, and
- preferably, the pixel coordinates of the body area to be made-up expressed in percentage of a zoom.

In an embodiment, if the make-up product selected by the subject does not belong to the list of reference make-up products, then the average color parameters are selected as those available for the reference make-up product having color parameters most similar to the selected one.

The trained model (or, each trained model if there is one model outputting R values, one model outputting G values and one model outputting B values) thus outputs RGB values of the pixels of the body area made-up with the selected make-up product.

During a step 260, a so-called "brightness correction" is then performed, which aims at improving the rendering of the makeup on the simulated image.

This correction is performed on the obtained color parameters, for the pixels identified at step 240 as belonging to the quantile of highest red component values or highest brightness.

In order to achieve this correction, the color parameters of the pixels belonging to the quantile of highest R value or brightness value identified at step 240 are replaced by the average values of the color parameters of pixels belonging to the highest corresponding quantile of colors with the same make-up product as the one selected by the subject, and which have been stored at step 130.

In an embodiment, if the make-up product selected by the subject does not belong to the list of reference make-up products, then the average color parameters are selected as those available for the reference make-up product having color parameters most similar to the selected one.

Last during a step 270, the processor generates a modified image of the body area of the subject in which the color parameters of the pixels of the body area without makeup are replaced by the color parameters of the pixels determined by the trained model, in order to simulate the rendering of the selected make-up product.

This step can be performed by changing the color parameters of the cropped portion of the image corresponding to the body area, and then replacing the body area within the image. Alternatively the whole face image can be rendered in which the color parameters of the body area have been replaced by the color parameters determined by the model.

Optionally, a gamma correction 280 may also be applied on the modified final image, in order to correct image's luminance and then improve the rendering.

The modified image is then transmitted to the display 12 and displayed 290 by the latter in order for the subject to visualize the image in which it is made-up with the selected make-up product.

With reference to FIGS. 4a to 4d and 5a to 5d, some examples are given showing the implementation of the simulation method on some exemplary images.

Figure 4A:
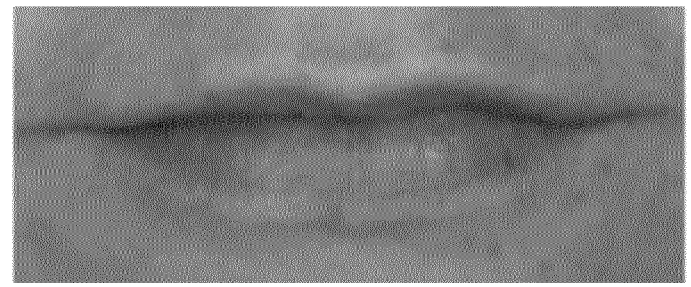
Figure 4D:
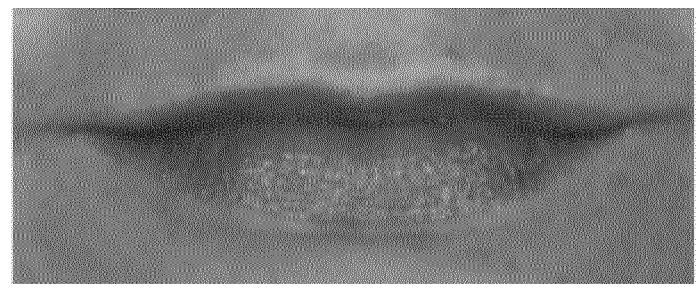
Figure 5A:
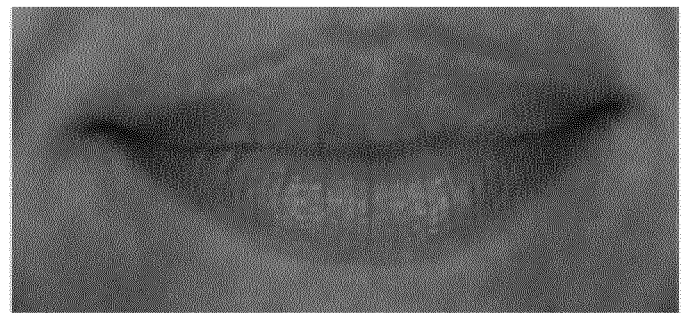
FIGS. 5a and 5d are same kinds of images as FIGS. 4a to 4d respectively, but with a different subject and a different make-up product.

On FIGS. 4a and 5a are shown two pictures of the lips of two subjects without make-up. FIGS. 4d and 5d are respectively pictures of the lips of the same subjects made-up with different make-up products.

Figure 4B:
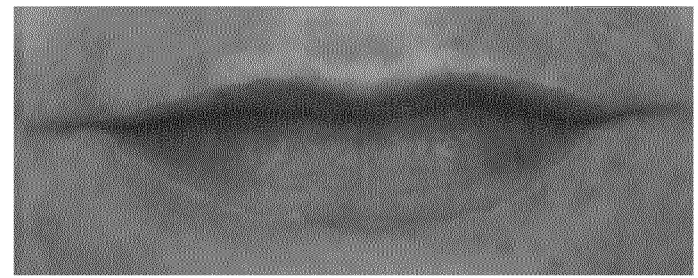
Figure 4C:
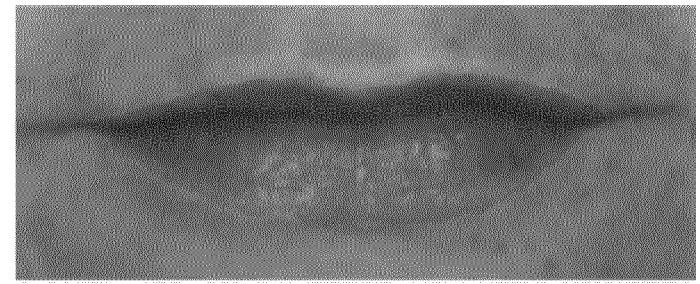
Figure 5B:
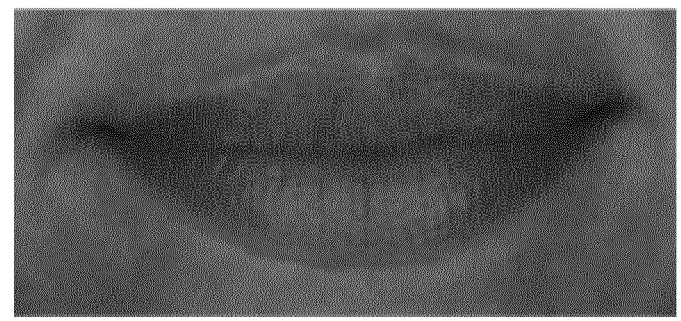
Figure 5C:
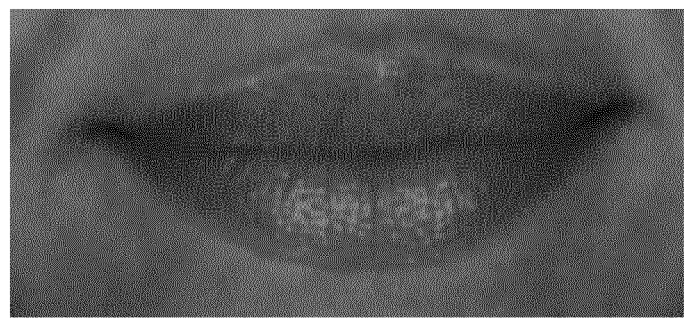
Figure 5D:
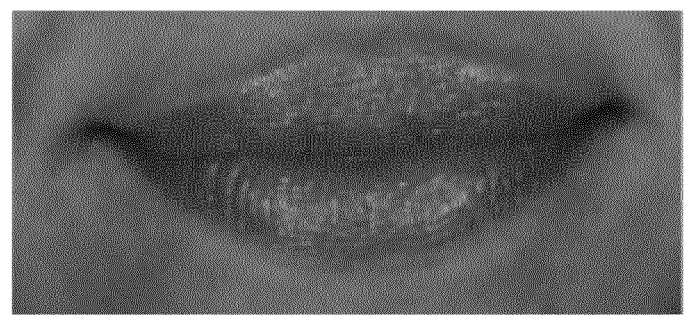

FIGS. 4b and 5b are images output by the trained model simulating the application of the respective make-up products without brightness correction, and FIGS. 4c and 5c are images output by the trained model simulating the application of the respective make-up products with brightness correction. One can see that the rendering of the make-up with brightness correction is very close from the actual image with the subject wearing the make-up.

The invention claimed is:

1. A method for simulating a rendering of a makeup product on a body area, the method being performed by a processor, and comprising:
    acquiring an image of the body area without makeup of a subject,
    determining first color parameters of the pixels of the image corresponding to the body area without makeup,
    identifying the pixels of the body area without makeup exhibiting highest brightness or red component value,
    determining second color parameters of the pixels of the image corresponding to the body area, wherein the second color parameters render a making up of the body area by the makeup product,
    wherein said determining second color parameters of the pixels of the image corresponding to the body area comprises:
        applying on the determined first color parameters and on the color parameters of the makeup product to be simulated, a simulation model configured to output color parameters of the pixels of the image corresponding to the same body area made-up with the make-up product, and
        correcting the obtained color parameters of the pixels of the body area identified as having highest brightness or red component value without makeup,
    the second color parameters comprising the corrected color parameters for the identified pixels and the color parameters output by the simulation model for the other pixels of the body area, and
    generating a modified image in which the first color parameters of each pixel corresponding to the body area are changed respectively into the corrected second color parameters,
    wherein the simulation model has been trained on a learning database comprising, for a plurality of reference make-up products, color parameters of the reference make-up product and a set of pairs of images of the body areas of reference subjects, each pair of images comprising an image of the body area of the reference subject without makeup and an image of the body area of the reference subject made-up with the reference make-up product.

2. The method according to claim 1, wherein the learning database further comprises:
    for each image, identification of a quantile to which a pixel of the body area in the image belongs, for each color component of the pixel,
    for each image, the coordinates of the pixels of the body area expressed in percentage of a zoom applied to the image,
    for each reference make-up product, average values per quantiles of the color parameters of the pixels of the body area with the reference make-up product.

3. The method according to claim 2, wherein the learning database further comprises:
    for each image, a brightness value of each pixel of the body area of the image, and an identification of the quantile of brightness values to which the pixel belongs, and
    for each reference make-up product, average values per quantiles of brightness of the pixels of the body area with the reference make-up products.

4. The method according claim 1, wherein the color parameters of a pixel of an image are values of the RGB color model, and the simulation model comprises three models configured to determine respectively red, green and blue values of the pixels from the input data.

5. The method according to claim 1, wherein the body area is chosen among the group consisting of:
    lips,
    eyelids, and
    nails,
    and the make-up product is:
    lipstick if the body area is the lips,
    eyeshadow if the body area is the eyelids, or
    nail polish if the body area is the nails.

6. A non-transitory computer-readable medium, comprising a set of code instructions stored thereon for implementing the method according to claim 1, when executed by a processor.

7. A device for simulating a rendering of a makeup product on a body area, the system comprising:
    a camera adapted to acquire the image of a body area to be made-up of a subject, a processor, adapted to receive and process the image acquired by the camera to generate a modified image simulating the rendering of a make-up product on the body area, and a display adapted to display the modified image, wherein the device is configured to implement the method according to claim 1.

8. A method for simulating a rendering of a makeup product on a body area, the method being performed by a processor, and comprising:

acquiring an image of the body area without makeup of a subject, determining first color parameters of the pixels of the image corresponding to the body area without makeup, identifying the pixels of the body area without makeup exhibiting highest brightness or red component value, determining second color parameters of the pixels of the image corresponding to the body area, wherein the second color parameters render a making up of the body area by the makeup product, wherein said determining second color parameters of the pixels of the image corresponding to the body area comprises:

applying on the determined first color parameters and on the color parameters of the makeup product to be simulated, a simulation model configured to output color parameters of the pixels of the image corresponding to the same body area made-up with the make-up product, and correcting the obtained color parameters of the pixels of the body area identified as having highest brightness or red component value without makeup, the second color parameters comprising the corrected color parameters for the identified pixels and the color parameters output by the simulation model for the other pixels of the body area, and generating a modified image in which the first color parameters of each pixel corresponding to the body area are changed respectively into the corrected second color parameters, wherein the correction step comprises replacing the color parameters of the pixels identified as having highest brightness or red component values, by respective average values of color parameters, the average values being computed over the pixels of highest red component or brightness values of body areas of images of reference subjects, made-up with a same reference make-up, said reference make-up product having color parameters most similar to the color parameters of the make-up product to be rendered.

9. The method according to claim 8, wherein pixels of highest red component values among pixels corresponding to the body area of an image are determined by:

computing quantiles of red component values of the pixels corresponding to the body area of the image, determining the pixels of highest red component values as the pixels belonging to at least the quantile comprising the pixels having the highest red component values.

10. A non-transitory computer-readable medium comprising a set of code instructions stored thereon for implementing the method according to claim 8, when executed by a processor.

11. A method for simulating a rendering of a makeup product on a body area, the method being performed by a processor, and comprising:

training a simulation model on a learning database comprising, for each one of a plurality of reference make-up products:

color parameters of the reference make-up product, and a set of pairs of images of the body area of reference subjects, each pair of images comprising an image of the body area without makeup of a reference subject and an image of the body area of the reference subject made-up with the make-up product, the simulation model being configured to determine, from input data comprising:

color parameters of a makeup product to be rendered, color parameters of pixels of an image corresponding to a body area of a new subject to be made-up, and color parameters of the pixels of the image corresponding to the same body area of the new subject, said body area being made up with the make-up product;

acquiring an image of the body area without makeup of a subject;

determining first color parameters of the pixels of the image corresponding to the body area without makeup;

identifying the pixels of the body area without makeup exhibiting highest brightness or red component value;

determining second color parameters of the pixels of the image corresponding to the body area, wherein the second color parameters render a making up of the body area by the makeup product, wherein said determining second color parameters of the pixels of the image corresponding to the body area comprises:

applying on the determined first color parameters and on the color parameters of the makeup product to be simulated, the simulation model configured to output color parameters of the pixels of the image corresponding to the same body area made-up with the make-up product, and correcting the obtained color parameters of the pixels of the body area identified as having highest brightness or red component value without makeup, the second color parameters comprising the corrected color parameters for the identified pixels and the color parameters output by the simulation model for the other pixels of the body area;

generating a modified image in which the first color parameters of each pixel corresponding to the body area are changed respectively into the corrected second color parameters.

12. The method according to claim 11, wherein the training of the simulation model comprises:

training a plurality of simulation models on the learning database, computing prediction errors of each of the plurality of simulation models on bootstrap samples among the learning database, and selecting the simulation model according to the computed prediction errors.

13. The method according to claim 11, further comprising, for each reference make-up product, a step of computing the average color parameters of the pixels having highest red component or brightness values of all the images of the reference subjects made-up with the reference make-up product, and storing the average color parameters for each reference make-up product in a memory.

14. The method according to claim 11, wherein the learning database further comprises, for each image, the coordinates of the pixels of the body area expressed in percentage of a zoom applied to the image.

15. A non-transitory computer-readable medium comprising a set of code instructions stored thereon for implementing the method according to claim 11, when it is executed by a processor.

\* \* \* \* \*